(12) United States Patent
Hacking et al.

(10) Patent No.: US 7,249,245 B2
(45) Date of Patent: *Jul. 24, 2007

(54) GLOBALLY OBSERVING LOAD OPERATIONS PRIOR TO FENCE INSTRUCTION AND POST-SERIALIZATION MODES

(75) Inventors: Lance E. Hacking, Portland, OR (US); Debbie Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 10/778,512

(22) Filed: Feb. 12, 2004

(65) Prior Publication Data

US 2004/0162969 A1    Aug. 19, 2004

Related U.S. Application Data

(62) Division of application No. 09/783,933, filed on Feb. 14, 2001, now Pat. No. 6,862,679.

(51) Int. Cl.
*G06F 9/312* (2006.01)

(52) U.S. Cl. ................... 712/225; 711/141; 712/216

(58) Field of Classification Search ............... None
See application file for complete search history.

(56) References Cited

U.S. PATENT DOCUMENTS

| 5,745,729 | A | * | 4/1998 | Greenley et al. | ........... 711/131 |
| 5,748,937 | A | * | 5/1998 | Abramson et al. | .......... 712/218 |
| 6,073,210 | A | * | 6/2000 | Palanca et al. | ............. 711/118 |
| 6,223,258 | B1 | * | 4/2001 | Palanca et al. | ............. 711/138 |
| 6,609,192 | B1 | * | 8/2003 | Guthrie et al. | ............. 712/216 |
| 6,651,151 | B2 | * | 11/2003 | Palanca et al. | ............. 711/163 |

\* cited by examiner

*Primary Examiner*—Kenneth S. Kim
(74) *Attorney, Agent, or Firm*—Trop, Pruner & Hu, P.C.

(57) ABSTRACT

A system includes a memory unit and a processor where the processor has a load buffer to store a first instruction and a cache controller to block the first instruction from dispatch into the cache controller until load data for load operations prior to the first instruction fetched from the memory unit are globally observed. The processor further may include a control register having a first mode storage to store a mode control selection for pre-serialization and a second mode storage to store a mode control selection for post-serialization to enable control of pre-serialization and post-serialization of load operations with respect to the first instruction. Other embodiments are described and claimed.

17 Claims, 6 Drawing Sheets

GLOBALLY OBSERVING LOAD OPERATIONS PRIOR TO FENCE INSTRUCTION AND POST-SERIALIZATION MODES

This is a divisional of patent application Ser. No. 09/783,933, filed Feb. 14, 2001 now U.S. Pat No. 6,862,679.

BACKGROUND

Memory accesses in a computer system typically follow a given set of rules to ensure that all agents in the system are working with the correct version of the data. The most rigid set of rules, referred to as strong ordering, requires among other things that all loads to a given agent are observable by other agents in the order in which they were issued, i.e., the program order.

While strong ordering guarantees correctness, it does so at the expense of performance. Processors can achieve high performance for loading information from memory if they are allowed to follow weaker rules. The weak ordering rule gives the processor the freedom to choose the highest performance way to load data from memory.

The weak ordering rule allows instructions to be executed out of order. This rule enhances processor's performance because instructions can be executed as soon as resources are available, avoiding wasteful idle periods.

However, at a particular reference time, the program running on a given agent may need to guarantee that all previous loads (or reads) from memory have been observed by all other agents. In addition, the program may also want to ensure that all loads by an agent subsequent to a particular reference time will not be observable before any previous loads. In essence, an agent may want to synchronize all loads issued by itself with respect to a particular timing point.

Prior art synchronization methods include the use of input/output (I/O) instructions, privileged instructions, uncacheable memory references, serializing instructions, and locked instructions. These methods implement the synchronization as part of their primary functions. However, these methods have a number of drawbacks. First, they all require the use of at least one register, taking away valuable storage resources. Second, they are slow due to the time spent to perform the primary function. Third, except serializing and locked instructions, other methods are privileged and not available to the applications users.

Therefore there is a need to provide an efficient method to synchronize load operations using minimal hardware resources.

BRIEF DESCRIPTION OF THE FIGURES

The features and advantages will become apparent from the following detailed description in which.

DETAILED DESCRIPTION

In the following description, for purposes of explanation, numerous details are set forth. However, it will be apparent to one skilled in the art that these specific details are not necessary. In other instances, well-known electrical structures and circuits are shown in block diagram form.

Figure 1:
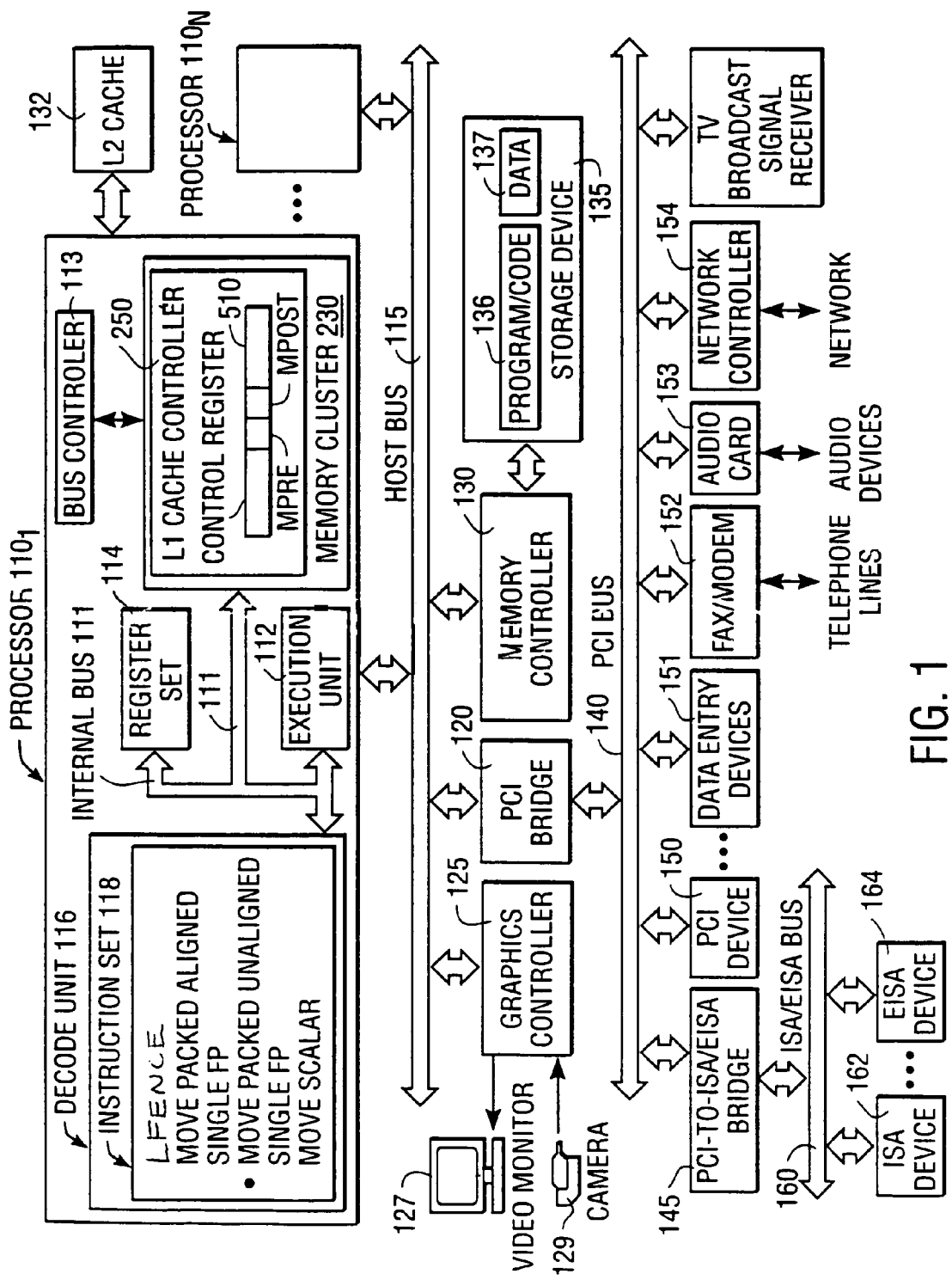
FIG. 1 is a diagram illustrating a system according to one embodiment.

FIG. 1 is a diagram illustrating a computer system according to one embodiment 100. While one exemplary computer system is described, various implementations can be used in any number of different computer systems (e.g., one that has more or less cache levels, one that uses a different register renaming and/or out-of-order execution architecture). For simplicity, only relevant elements of the system 100 are shown. The computer system 100 includes the processor 110, a backside bus 275, a level 2 (L2) cache subsystem 132, the processor bus 115, the memory controller 130, and the storage device 135.

The processor 110 includes the decoder 116, a reservation station 210, a reorder buffer and register file 220, the execution unit 112, a memory cluster 230, a bus controller 113, and a write-back data bus 255. The memory cluster 230 further includes a memory ordering unit 240 and a Level 1 (L1) cache controller 250 (L1CC). For simplicity, the L1 cache memory is not shown. The L1 cache controller 250 contains the control register 510 having two mode bits MPRE and MPOST.

The decoder 116 issues instructions to the reservation station 210 and to the re-order buffer 220. The reservation station 210 dispatches the decoded instruction to the execution unit 112 and the memory cluster 230. If the instruction is ready to be executed, the execution unit will carry out the operation. If the instruction is a memory-referencing instruction, it will be dispatched to the memory ordering unit 240 for preparation for access the L1 cache (for cacheable instructions only) via the L1 cache controller 250.

The write-back bus 255 provides the data path for the L1 cache controller 250 or the execution unit 112 to return the data back to the re-order buffer and the register file 220 and the reservation station 210.

The bus controller 113 provides an interface between the processor 110 and the L2 cache subsystem 132 and the bus 115. The bus controller 113 includes an external bus controller 262 and a backside bus controller 266. The external bus controller 262 provides the interface to the bus 115 to which the memory controller 130 is connected. The backside bus controller 266 provides an interface to the L2 cache subsystem 132 via the backside bus 275.

Basic Processor Architecture

Figure 2:
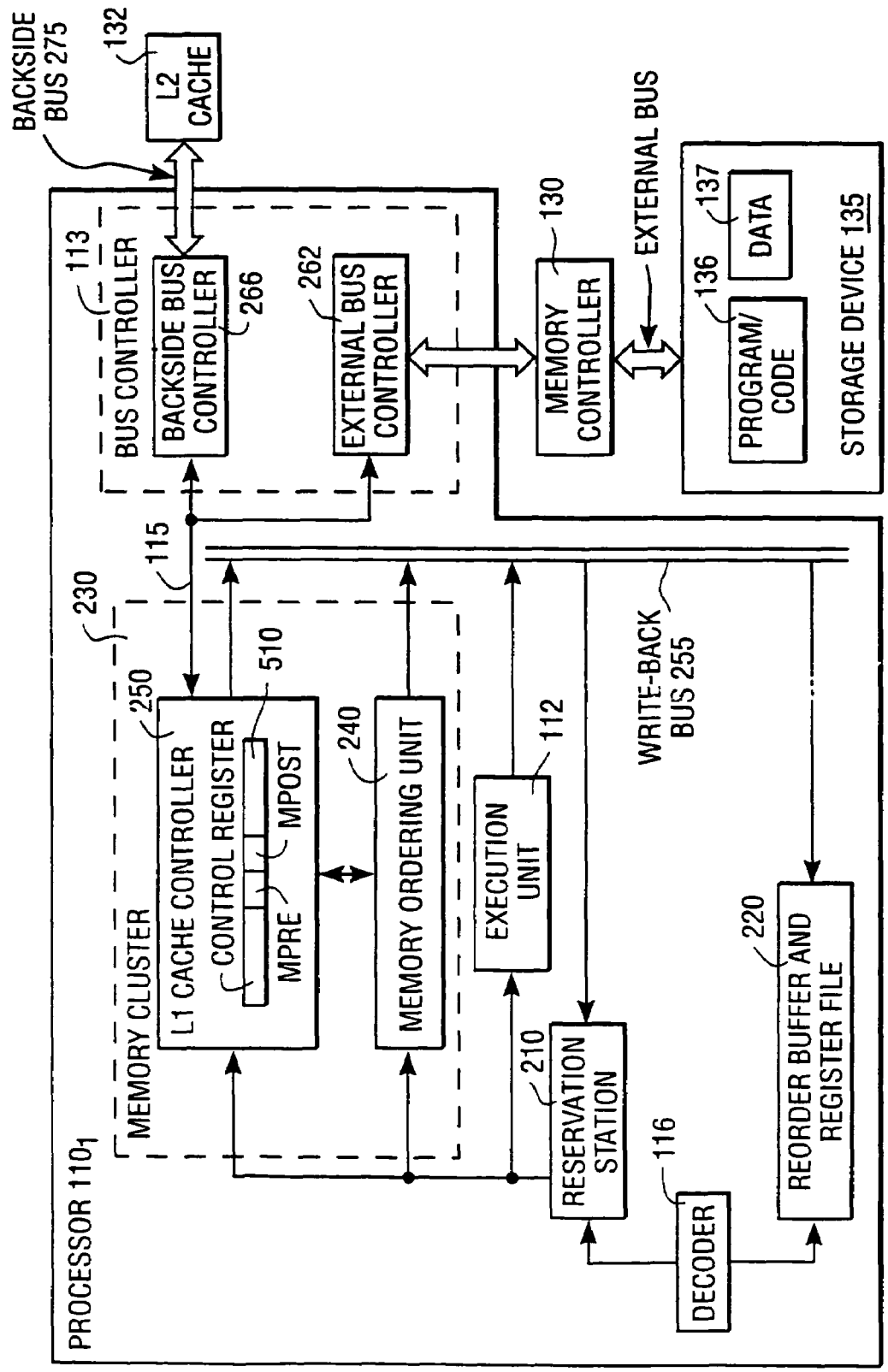
FIG. 2 is a diagram illustrating a processor according to one embodiment.

FIG. 2 illustrates a processor $110_1$ including a decode unit 116, a set of registers 114, a bus controller 113, a memory cluster 230, an execution unit 112, and an internal bus 111 for executing instructions. Of course, the processor $110_1$ contains additional circuitry. The decode unit 116, registers 114 and execution unit 112 are coupled together by the internal bus 111. The bus controller 113 provides interface to the host bus 115 and an external cache 132 (e.g., L2 cache). The decode unit 116 is used for decoding instructions received by processor 110 into control signals and/or microcode entry points. In response to these control signals and/or microcode entry points, the execution unit 112 performs the appropriate operations. The decode unit 116 may be implemented using any number of different mechanisms (e.g., a look-up table, a hardware implementation, a PLA, software translation routines, or a combination of hardware and software translation, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation. The memory cluster 230 includes a L1 cache controller 250, which contains a control register 510. The control register 510 has two mode selection bits pre-serialization mode (MPRE) and post-serialization mode (MPOST).

The decode unit 116 is shown including packed data instruction set 118 for performing operations on packed data. In one embodiment, the packed data instruction set 118 includes the following instructions: a load fence, a move packed aligned, a move packed unaligned, and a move scalar. In addition to the packed data instructions, the processor $110_1$ can include new instructions and/or instructions similar to or the same as those found in existing general purpose processors. For example, in one embodiment the processor $110_1$ supports an instruction set which is compatible with the Intel Architecture instruction set used by existing processors, such as the Pentium® processor manufactured by Intel Corporation of Santa Clara, Calif. Alternative embodiments may contain more or less, as well as different, packed data instructions.

The registers 114 represent a storage area on processor $110_1$ for storing information, including control/status information, integer data, floating point data, and packed data. The storage area used for storing the packed data is not critical. The term data processing system is used herein to refer to any machine for processing data, including the computer systems(s) described with reference to FIG. 1.

Figure 3:
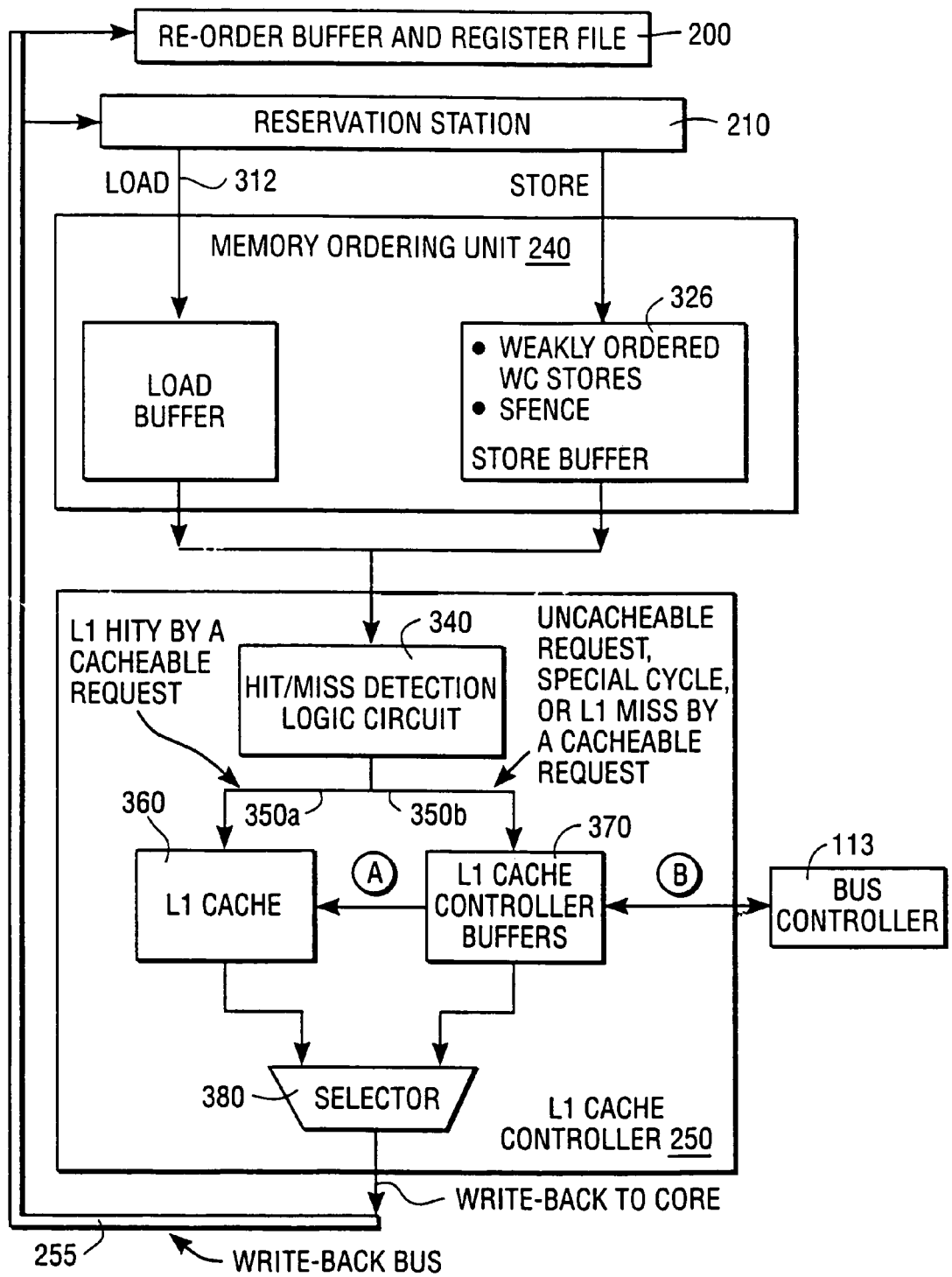
FIG. 3 is a diagram illustrating a relationship and data paths between the reservation unit and the memory control elements according to one embodiment.

FIG. 3 is a diagram illustrating the relationship and data paths between the reservation station 210 and the various memory control elements. It is assumed that the decoded instructions are memory-referencing instructions.

As shown in FIG. 3, the reservation station dispatches the instruction to the memory ordering unit 240 via the Load Bus 312 or the Store Bus 316 if the instruction is a load or store instruction, respectively. The memory ordering unit 240 includes a load buffer unit 322 and a store buffer unit 326. The load buffer unit 322 receives the load instructions via the load bus 312. The load buffer unit 322 receives the loads and the load fence (LFENCE) instruction to synchronize the weakly ordered loads.

Instructions in the load buffer unit 322 and store buffer unit 326 are dispatched to the L1 cache controller 250. The L1 cache controller 250 includes a hit/miss detection logic 340, a L1 cache 360, a L1 cache controller buffer 370, and a write-back selector 380. The hit/miss detection logic 340 detects if the load or store instruction hits the L1 cache or any other L1 cache controller array or buffer structure. If the instruction is a cacheable request and has a L1 hit, the cache access is provided via a bus 350A to the L1 cache 360. If the instruction is an uncacheable request, a special cycle, or cacheable request with a L1 miss, the request is routed to the L1 cache controller buffer 370 via a bus 350B. For a cacheable request with a L1 miss, the missing data is transferred to the L1 cache 360 from the L1 cache controller buffer unit 370 via path A. This data typically comes from the L2 cache or the external memory.

The bus controller 113 services the requests from the L1 cache controller buffer 370 via path B. For cacheable request misses or uncacheable loads, the data flow is from the bus controller 260 to the L1 cache controller buffer 370. For uncacheable stores or writes, the data flow is from the L1 cache controller buffer 370 to the bus controller 113.

For loads, data are written back to the core, i.e., the re-order buffer and register file 220. The write-back data may come from the L1 cache 360 (for cache hits) or the L1 cache controller buffer 370 (for cacheable misses or uncacheable loads). The selector 380 switches between these two write-back sources to the write-back bus 255. The write-back data are then written to the re-order buffer and register file 220 and the reservation station, and the write-back data valid bit is written to the re-order buffer.

Figure 4:
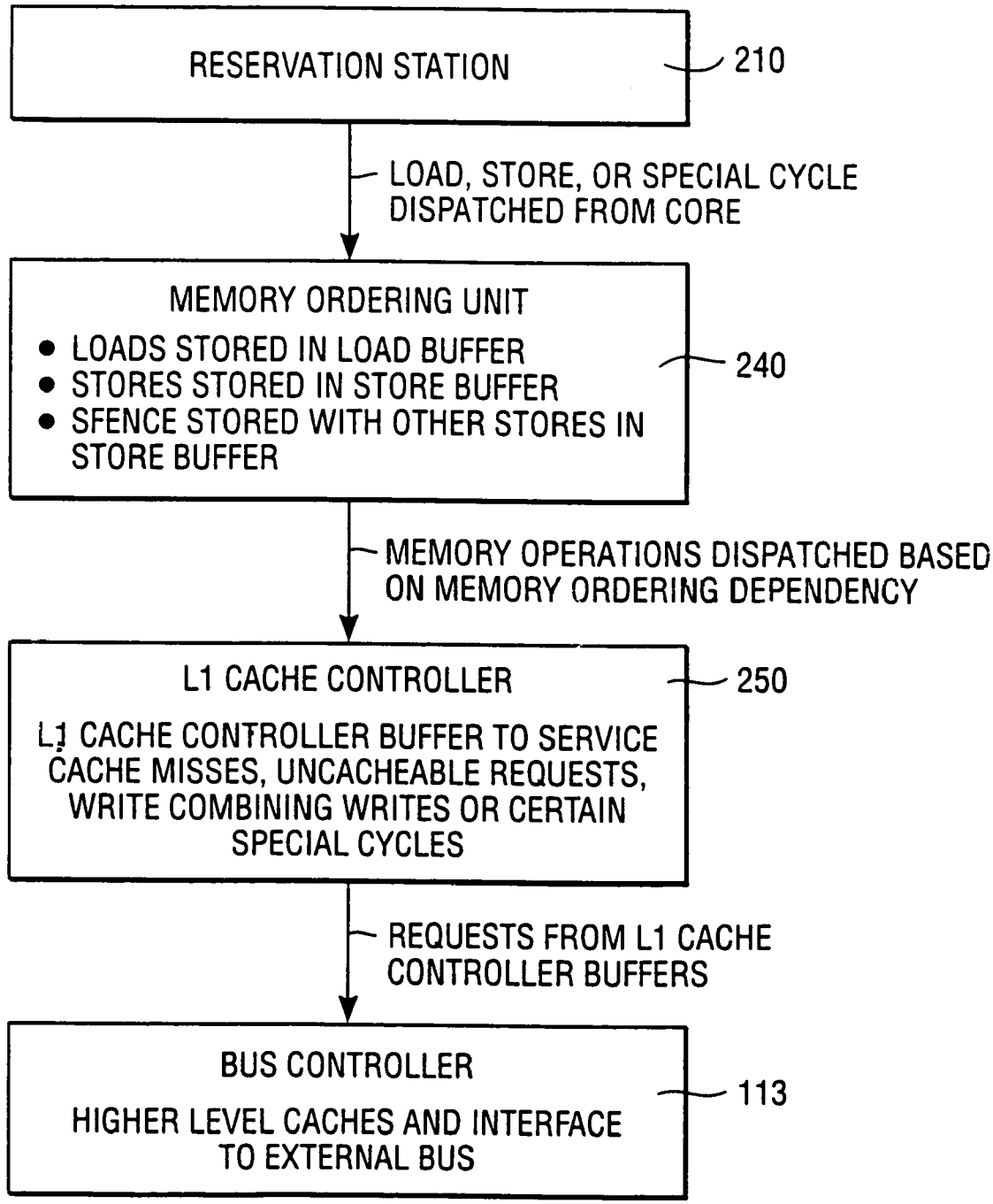
FIG. 4 is a diagram illustrating a data flow between different elements in the processor according to one embodiment.

FIG. 4 is a diagram illustrating the data flow between different elements in the processor. As shown in FIG. 4, the data flow involves the reservation station 210, the memory ordering unit 240, the L1 cache controller 250, and the bus controller 113.

From the reservation station 210 to the memory ordering unit 240, the data flow includes a load, a store, and a special cycle. These data requests are dispatched from the processor core. At the memory ordering unit 240, all loads (or reads) are stored in the load buffer unit, all stores (or writes) are stored in the store buffer unit, all load fence instructions are stored with other loads in the load buffer unit.

The memory operations involved in the loads, stores, or load fences are dispatched from the memory ordering unit 240 to the L1 cache controller 250 based on memory ordering dependencies. At the L1 cache controller 250, the L1 cache controller buffer services cache misses, uncacheable requests, write combining writes, and certain special cycles. The execution of the load fence instruction is considered a special cycle. For cache hits by cacheable operations, the L1 cache is accessed.

If the memory operation is satisfied from the L2 cache or the main memory, the L1 cache controller buffer send requests to the bus controller 113. At the bus controller 113, requests are sent to lower level caches such as the L2 cache, or to the main memory.

Theory of the Load Fencing Mechanism

Fencing is a mechanism used to ensure synchronization between the processor core and consumer hardware when weakly ordered load instructions are used. The LOAD FENCE (LFENCE) instruction provides an efficient way of ensuring ordering between instruction streams that produce weakly ordered results.

In one embodiment, the LFENCE instruction has no associated data field. The re-order buffer ignores the data on the writeback bus at the cycle of retirement for a LFENCE macro-instruction. In addition, the LFENCE instruction is treated as a no-operation (NOP) by the L1CC (i.e., there is no change in its state). To facilitate synchronization, the LFENCE instruction is dispatched to the L1CC only after all instructions preceding the LFENCE instruction have already been dispatched and accepted by the L1CC.

The LFENCE mechanism is supported by two serialization techniques: pre-serialization and post-serialization. The pre-serialization and post-serialization techniques include those operations that are in program order before and after, respectively, the LFENCE instruction. Both the pre-serialization and post-serialization provide an option to select a default behavior and an enhanced behavior.

Figure 5:
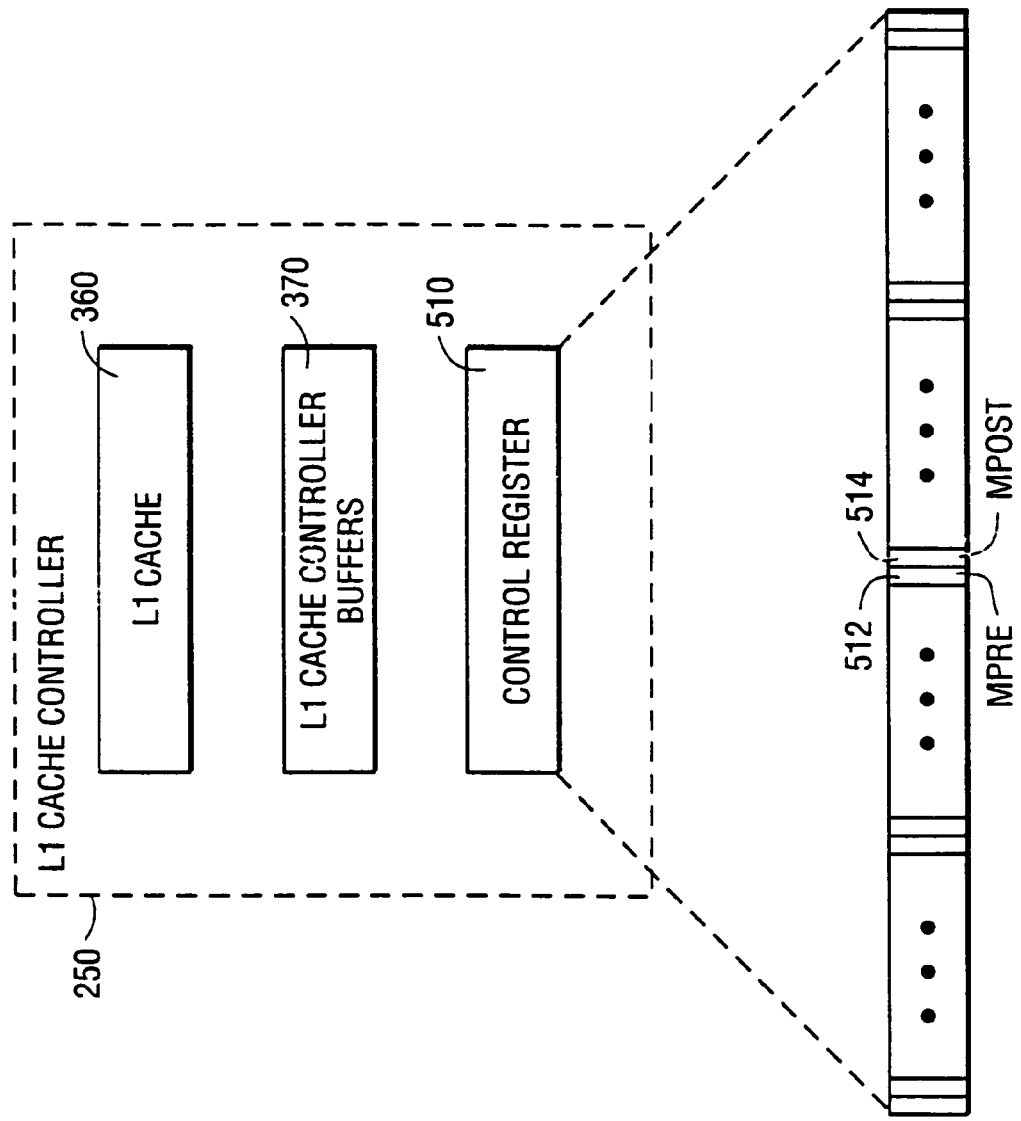
FIG. 5 is a diagram illustrating a control register for mode selection according to one embodiment.

FIG. 5 is a diagram illustrating a control register 510 in the L1 cache controller according to one embodiment. The control registers 510 stores a number of bits to control various operations of the L1 cache controller. In one embodiment, the control register 510 includes 32 bits. As shown in FIG. 5, the control register 510 includes a pre-serialization mode (MPRE) bit 512 and a post-serialization mode (MPOST) bit 514.

The MPRE bit 512 is used to select the mode of pre-serialization. In one embodiment, when the MPRE bit is cleared (i.e., 0), the default behavior mode is selected; when the MPRE bit is set (i.e., 1), the enhanced behavior mode is selected.

The MPOST bit 514 is used to select the mode of the post-serialization techniques. In one embodiment, when the MPOST bit is cleared (i.e., 0), the default behavior mode is selected; when the MPOST bit is set (i.e., 1), the enhanced behavior mode is selected.

Pre-serialization:

Pre-serialization relates to the operations before the LFENCE instruction. When pre-serialization is enabled, the LFENCE instruction fences load operations. In the L1CC, there are a number of buffers that can service various types of memory accesses. The memory accesses relevant to the LFENCE include load operations.

For load operations prior to the LFENCE instruction, the servicing buffers need to be globally observed before the LFENCE is accepted by the L1CC. The retirement of the LFENCE is gated (or conditioned) upon the previous load operations being globally observed. The steps after being globally observed for loads to be completed include reading the data to an appropriate register and subsequent deallocation from the buffers in the L1CC. However, other steps in other embodiments may be implemented.

In pre-serialization, outstanding stores do not block the LFENCE and loads need to be globally observed before the LFENCE can be accepted by the L1CC. In other words, outstanding stores do not block the LFENCE and all loads need to be globally observed before the LFENCE can be accepted by the L1CC.

Post-serialization:

Post-serialization relates to the operations subsequent to the LFENCE. Two techniques may be used, one for default behavior and one for enhanced behavior. The mode is controlled by the post-serialization mode bit (MPOST) in the control register as shown in FIG. 5.

In the default behavior, instructions following the LFENCE in program order are blocked from being dispatched to the L1CC until the L1CC accepts the LFENCE. Coupled with pre-serialization, this implies that all instructions preceding the LFENCE in program order are globally observed before any instruction which follows the LFENCE in program order is globally observed.

In the enhanced behavior, stores subsequent to the LFENCE are allowed to be executed out of order with respect to the LFENCE. This behavior usually enhances the performance because the stores do not have to wait for the LFENCE to be completed.

Figure 6:
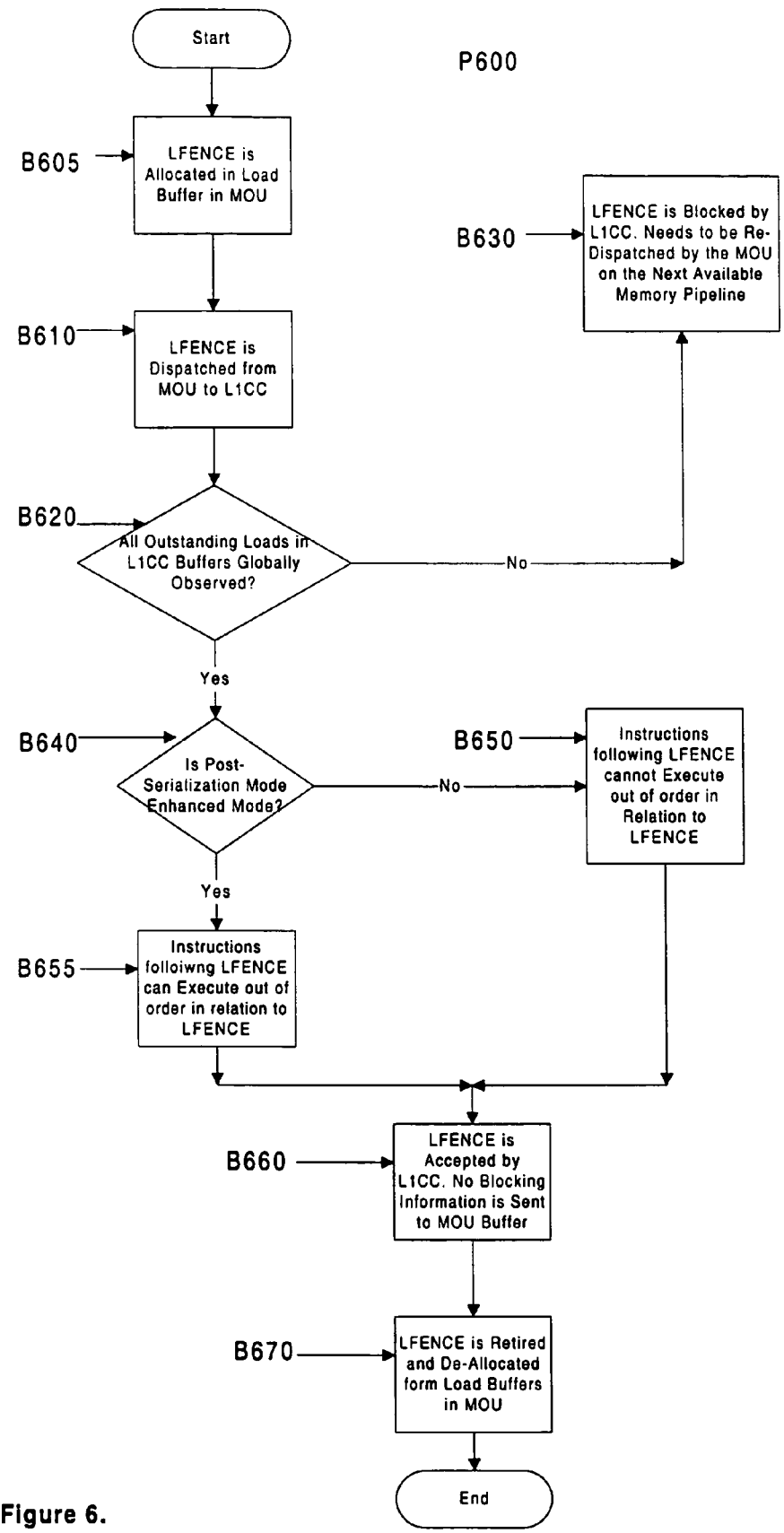
FIG. 6 is a flowchart illustrating synchronizing load operations according to one embodiment.

FIG. 6 is a flowchart illustrating a process P600 for synchronizing load operations according to one embodiment. It is assumed that the LFENCE has been allocated in the load buffer in the memory ordering unit (MOU) and all previous instructions have been dispatched and accepted by the L1CC.

Upon START, the process P600 enters block B610 that dispatches the LFENCE instruction from the memory ordering unit (MOU) to the L1 cache controller (L1CC). Then the process P600 enters block B620 to determine if all outstanding loads in the L1CC buffers are globally observed. If all outstanding loads in the L1CC buffers are not globally observed, the process P600 enters block B630. In block B630, the L1CC blocks the LFENCE indicating that load instructions prior to the LFENCE have not been globally observed. It should be noted that non-globally observed stores do not block the LFENCE. Upon receipt of the blocking signal from the L1CC, the MOU will attempt to re-dispatch the LFENCE in the next available memory pipeline as shown in block B610.

If all outstanding loads in the L1CC buffers have been globally observed and post-serialization is in enhanced mode B640, then instructions following LFENCE may not be executed out of order with respect to LFENCE B650. Otherwise, instructions following LFENCE may be executed out of order with respect to LFENCE B655.

In block B660, the LFENCE is accepted by the L1CC and the L1CC does not send any blocking information to the MOU buffer. Then the process P600 enters block B670 to retire the LFENCE and de-allocates the load buffer in the MOU. The process P600 then terminates.

Thus, a method and apparatus for synchronizing load operations is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A system comprising:
   a memory unit;
   a processor, the processor comprising a load buffer to store a first instruction and a cache controller to block the first instruction from dispatch into the cache controller until load data for load operations prior to the first instruction fetched from the memory unit are globally observed, the processor further including a control register to enable control of pre-serialization and post-serialization of load operations with respect to the first instruction, the control register having a first mode storage to store a mode control selection for the pre-serialization and a second mode storage to store a mode control selection for the post-serialization;
   a memory controller;
   a bus to couple the memory unit and the memory controller to the processor.

2. The system of claim 1 wherein the memory unit is to store a first and second load operation separated in program order by the first instruction to be fetched by the processor.

3. The system of claim 2 wherein the second load operation does not appear on the bus until target data of the first load operation is loaded into the processor and subsequently observed.

4. The system of claim 1 wherein the memory unit is to store a first plurality of load operations and a second plurality of load operations separated in program order by the first instruction.

5. The system of claim 4 wherein the first plurality of load operations are to be serialized with respect to the first instruction and the second plurality are to be serialized with respect to the first instruction.

6. The system of claim 4 wherein the first plurality of load operations are to appear on the bus before the second plurality of load operations.

7. The system of claim 4 wherein target data of each of the first plurality of load operations is to be loaded into the processor and subsequently observed before the second plurality of the load operations are to appear on the bus.

8. The system of claim 7 wherein the first instruction is a load fence (LFENCE) instruction.

9. The system of claim 4, wherein one or more instructions following the first instruction are to be executed out of order if the mode control selection for the post-serialization is of a first value.

10. The system of claim 9, wherein the one or more instructions following the first instruction are to be prevented from execution out of order if the mode control selection for the post-serialization is of a second value.

11. A system comprising:
a memory unit;
a processor coupled to the memory unit, the processor including a buffer to store pending instructions including a fence instruction, and a cache controller to block the fence instruction from dispatch into the cache controller until load operations associated with any of the pending instructions prior to the fence instruction are globally observed, the processor further including a control register including a post-serialization control indicator to enable selection of a first mode or a second mode for post-serialization of instructions occurring subsequent to the fence instruction, wherein the first mode is to allow at least some instructions subsequent to the fence instruction to execute out of order with respect to the fence instruction and the second mode is to prevent the instructions subsequent to the fence instruction from execution out of order with respect to the fence instruction;
a memory controller;
a bus to couple the memory unit and the memory controller to the processor.

12. The system of claim 11, wherein the memory unit is to store a first and second load operation separated in program order by the fence instruction.

13. The system of claim 12 wherein the second load operation is to not appear on the bus until target data of the first load operation is loaded into the processor and subsequently observed.

14. The system of claim 11, wherein the control register further comprises a pre-serialization control indicator to enable selection of a first mode or a second mode for pre-serialization of instructions occurring prior to the fence instruction.

15. The system of claim 14, wherein the processor is to allow an instruction subsequent to the fence instruction to execute out of order with respect to the fence instruction if there is no dependency between said instruction and the load operations, based on the post-serialization control indicator.

16. The system of claim 11, wherein the at least some instructions subsequent to the fence instruction comprise store instructions.

17. The system of claim 14, wherein the cache controller includes the control register.

* * * * *